United States Patent
Franke

(10) Patent No.: US 7,940,804 B2
(45) Date of Patent: May 10, 2011

(54) COMMUNICATION SYSTEM

(75) Inventor: Michael Franke, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 363 days.

(21) Appl. No.: 11/919,090

(22) PCT Filed: Apr. 21, 2006

(86) PCT No.: PCT/EP2006/061733
§ 371 (c)(1),
(2), (4) Date: Dec. 19, 2008

(87) PCT Pub. No.: WO2006/114391
PCT Pub. Date: Nov. 2, 2006

(65) Prior Publication Data
US 2009/0303989 A1    Dec. 10, 2009

(30) Foreign Application Priority Data
Apr. 25, 2005  (DE) .......................... 10 2005 019 105

(51) Int. Cl.
*H04J 3/06*    (2006.01)
(52) U.S. Cl. ....................................................... 370/503
(58) Field of Classification Search ................... 370/498, 370/503, 442, 458; 455/553.1
See application file for complete search history.

(56) References Cited

U.S. PATENT DOCUMENTS

| | | | |
|---|---|---|---|
| 5,428,608 A | 6/1995 | Freeman et al. | |
| 2001/0009544 A1* | 7/2001 | Vanttinen et al. | 370/338 |
| 2002/0054589 A1* | 5/2002 | Ethridge et al. | 370/352 |
| 2003/0059005 A1 | 3/2003 | Meyerson et al. | |
| 2004/0186877 A1* | 9/2004 | Wang et al. | 709/200 |
| 2009/0201907 A1* | 8/2009 | Nanda et al. | 370/345 |

FOREIGN PATENT DOCUMENTS

| | | |
|---|---|---|
| DE | 100 58 524 A1 | 6/2002 |
| EP | 0 789 470 A2 | 8/1997 |

* cited by examiner

*Primary Examiner* — Derrick W Ferris
*Assistant Examiner* — Omar Ghowrwal

(57) ABSTRACT

A transmission of data in a communication system, e.g., a switched network with a plurality of subscribers who are interconnected in pairs via data circuits, especially lines is provided. At least one of the pairs of subscribers is interconnected via first line or a separate second line. The first line is used for transmitting real-time-critical data between the pair of subscribers while the second line is used for transmitting non-real-time-critical data between the pair of subscribers.

5 Claims, 4 Drawing Sheets

US 7,940,804 B2

COMMUNICATION SYSTEM

CROSS REFERENCE TO RELATED APPLICATIONS

This application is the U.S. National Stage of International Application No. PCT/EP2006/061733, filed Apr. 21, 2006 and claims the benefit thereof. The International Application claims the benefits of German application No. 102005019105.3 DE filed Apr. 25, 2005, both of the applications are incorporated by reference herein in their entirety.

FIELD OF INVENTION

The invention relates to a communication system, for example a switched network, with a plurality of subscribers that are connected to each other (in pairs) over data connections, especially lines.

BACKGROUND OF INVENTION

A switched network is described for example in DE 100 58 524 A1. Subscribers of a switched network can be computers, programmable logic controllers or other devices which exchange data with other machines, especially process such data. By contrast with bus systems in which any subscriber can reach any other subscriber directly via the data bus, a switched network exclusively involves point-to-point connections, i.e. a subscriber can only reach all other subscribers of the switched data network indirectly by appropriate forwarding of the data to be transmitted by means of one or more data connections (coupling units).

In distributed automation systems specific data must arrive at specific times at the subscribers for whom it is intended and be processed by the recipients. This is referred to as real-time-critical data or data traffic since, it the data does not arrive at its intended location at the right time, this can lead to undesirable results for the subscriber. At the same time non-real-time-critical data is created and must be transferred in switched networks.

DE 100 58 524 A1 makes provision for mixed operation of real-time-critical and non-real-time-critical data communication by transmitting data between two subscribers in each case, especially a sender and a receiver, in at least one transmission cycle with a configurable duration, with each 2 transmission cycle being subdivided into at least one first area for transmission of real-time-critical data for real-time control and at least one second area for transmission of non-real-time-critical data.

EP 0 789 470 A2 discloses a gateway which can be used within the framework of telecommunications. This connects networks intended for voice transmission (telephone networks) to data networks (LAN, WAN, Internet). By means of this gateway there can be access from one of these networks to the other network respectively. A signal which includes both voice streams and also data streams can be split up by a gateway and optionally sent via the voice network, the data network or via both networks.

SUMMARY OF INVENTION

In the prior art, especially in accordance with DE 100 585 24 A1, the problem which arises is that the real-time-critical data is to be transferred in short cycles.

In a system in accordance with DE 100 585 24 A1 the minimum basic clock for real-time-critical data amounts to 31.25 µs.

For the non-real-time-critical data frame lengths of 1.5 kbytes must be transmitted for an unrestricted open Ethernet-standard communication. For this, at a rate of 100 Mbaud, a period of approx. 125 µs must be made available. This produces a minimum communication cycle of 156.25 µs. In the prior art in accordance with DE 100 58 524 A1 an individual communication cycle cannot be shorter than this 156.25 µs.

In automation in particular it is desirable for improving closed-loop control processes to greatly reduce the cycle times. As a result of the sequential transmission of real-time-critical and non-real-time-critical data the non-real-time-critical data extends the minimum possible communication cycle.

The object of the invention is to provide a solution for how the cycle times can be reduced.

The invention achieves this object by connecting a pair of subscribers via a first and a second data connection separate from said subscribers (or also a coupling unit) especially a line, with a controller being designed to assign real-time critical data to the first data connection so that the real-time-critical data can be transmitted over a first data connection and non-real-time-critical data to the second data connection so that the non-real-time-critical data can be transmitted over second data connection.

The invention now consists of dividing up the information necessary for the communication system onto parallel lines. This also applies to communication services for which transmission is undertaken in the form of real-time-critical and non-real time-critical data.

The non-real-time-critical data can include data for the planning of the real-time-critical transmission, the so-called Context Management Data (CMD).

The fact that the inventive real-time-critical data is transmitted over different data connections makes it possible to retain long cycle times for the transmission of the non-real-time-critical data and simultaneously to transmit the non-real-time-critical data on the second data connection with correspondingly short cycle times.

In particular it becomes possible to send the data over the first data connection in transmission cycles of 31.25 µs duration or in the future even shorter cycles.

An example of a communication system is a switched network. Since the transfer of data in the switched network is always undertaken in pairs and the data for a subscriber which is to be forwarded to a further subscriber is also transmitted between two subscribers, there are data constrictions in switched networks known as bottlenecks. These are points at which the non-real-time-critical data is especially extensive and prevents the cycle time being reduced. Within the framework of the invention it is especially advantageous if, at precisely these points between pairs of subscribers, first and second data connections are provided over which the real-time-critical and non-real time-critical data can be transmitted separately.

The invention also relates to a method for operating a communication system, especially a switched network with a plurality of subscribers, in which real-time-critical and non-real-time-critical data is transmitted between two subscribers in each case, which is characterized by the fact that between at least one pair of subscribers the real-time-critical data is transmitted over a first connecting line and the non-real-time-critical data over a second connecting line separate from the first line. An appropriate assignment is undertaken by a controller.

The invention also includes a method for remedying a data bottleneck for data communication in a switched network in which real-time-critical and non=real-time-critical data is transmitted between two subscribers over a first data connection in each case, which is characterized in that a second data connection is provided at the data bottleneck with the real time-critical data then being sent over the first and the non-real-time-critical data over the second data connection.

BRIEF DESCRIPTION OF THE DRAWINGS

An advantageous embodiment of the invention will now be described with reference to the drawing, in which.

DETAILED DESCRIPTION OF INVENTION

Figure 1:
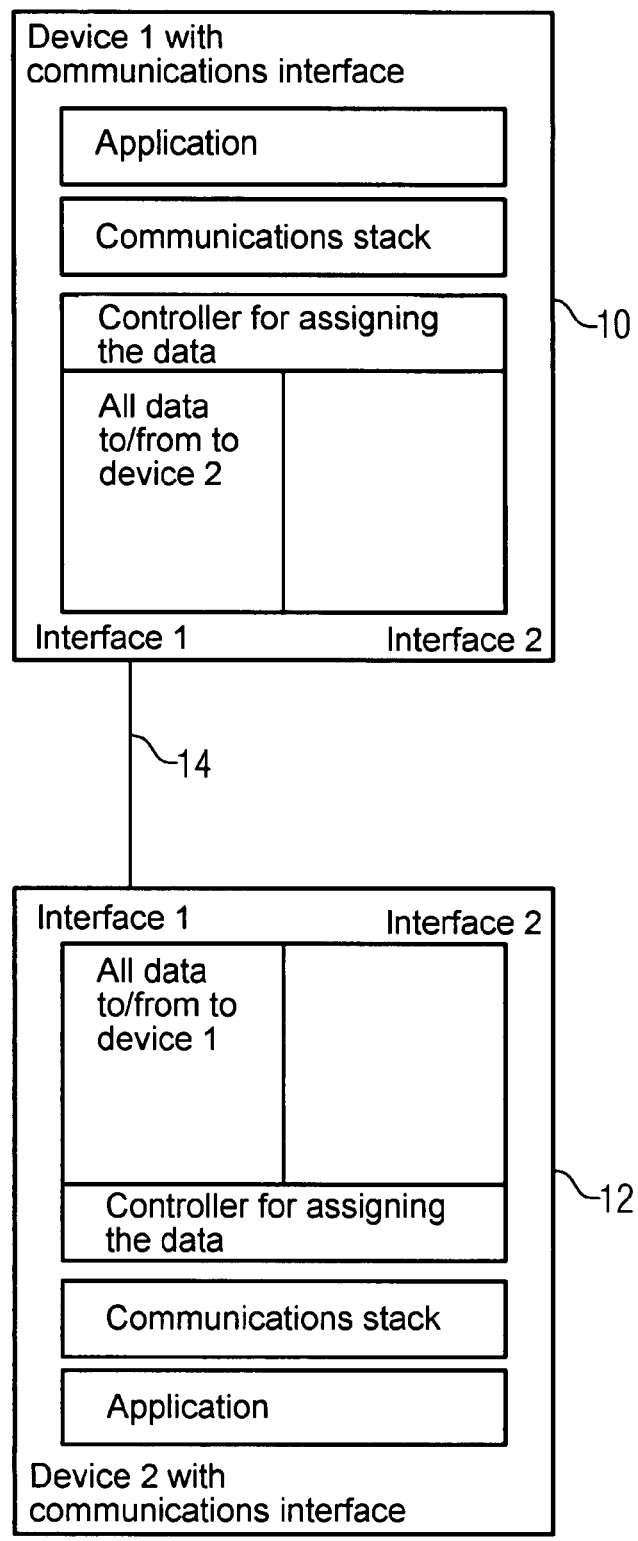
FIG. 1 shows two subscribers of a communication system in accordance with the prior art.

FIG. 1 shows a section of a communication system of the prior art with two subscribers, namely with a first device 10 and with a second device 12. Both devices can both send and receive. The subscribers 10 and 12 are connected to each other via a data line 14. The data line is connected for both devices 10 and 12 to the respective interface 1 of the subscribers. The respective interfaces 2 of the first device 10 and of the second device 12 are shown here as not connected. However a further subscriber of the communication system could be connected in each case via the two interfaces 2.

The software control of the respective devices is undertaken in the units "application", "communications stack" and a controller for assignment of the data. The control allocates all data which is sent to the second device 12 or is received by this device to interface 1. Accordingly the second device 2 also includes a controller for assignment of the data which assigns all data which originates from the first device 10 or is sent to this device to the interface 1.

Figure 2:
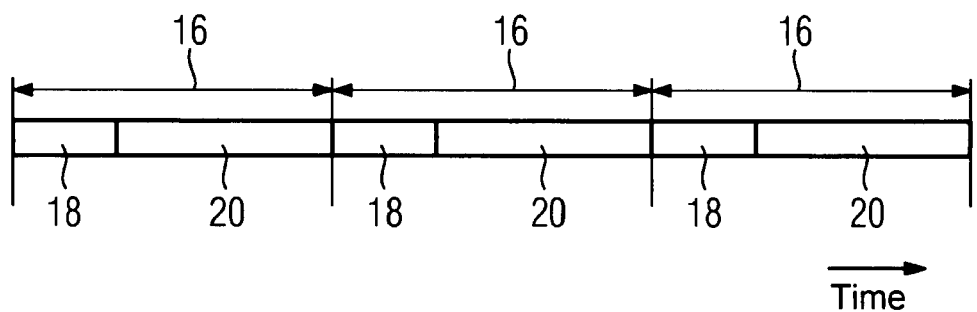
FIG. 2 shows three communication cycles between the two said subscribers.
Figure 4:
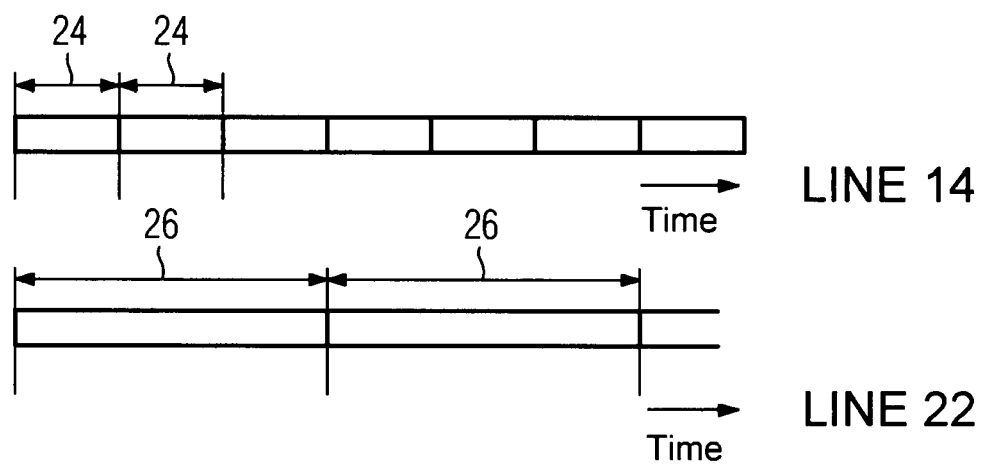
FIG. 4 shows the communication cycles over the two lines depicted in FIG. 3.

The data is transmitted over the line 14 in the way depicted in FIG. 2: In FIG. 2 the time is shown along the axis and this is divided into communication cycles 16. Each communication cycle 16 is for its part subdivided into two areas 18 and 20. The area 18 is the period over which the real time-critical data is transmitted over the line 14. Real-time-critical data is data for which a precise statement about the time of arrival of the data can be made; a highly deterministic phase is thus involved (planned cyclic communication). The non-real-time-critical data (standard communication) is transmitted in each case in the areas 20. The non-real-time-critical data is not planned data but can include data for the planning of the real-time-critical data (Context Management Data). As mentioned, both the real time-critical and also the non-real-time-critical data are assigned to the respective interface 1 by the controller for assigning the data in the two devices 10 and 12.

If frames of 1.5 kbytes in size are to also be transmitted in the areas 20 the area 20 needs at least 125 µs. In the prior art the cycle 16 can last for one millisecond for example so that a generous 500 µs is available for the area 18 for the transmission of real-time-critical data and for the area 20 500 µs is also available for the transmission of non-real-time-critical data.

Figure 3:
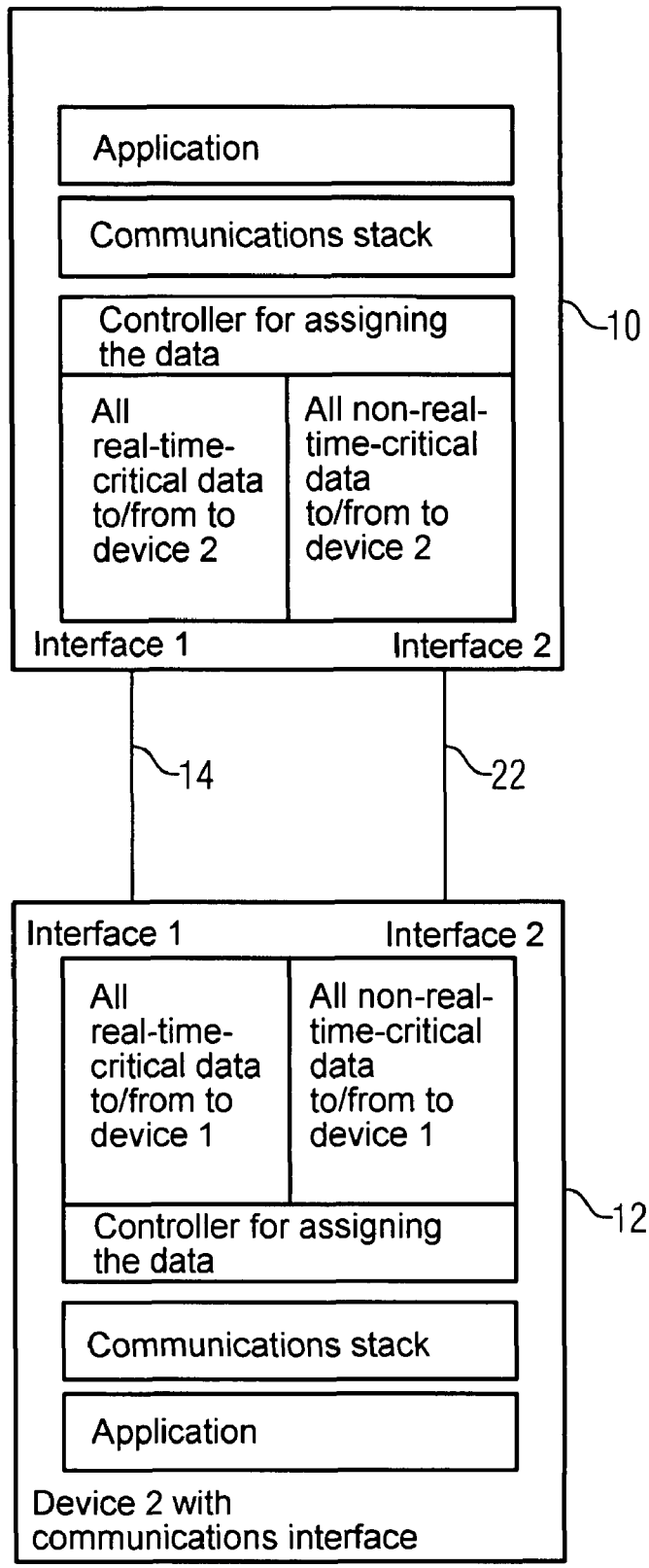
FIG. 3 shows two subscribers of a communication system that are connected to each other in accordance with invention via two lines.

Many applications, for example in the machine tools field, require a short closed-loop control cycles. The real-time-critical data needed for the control must be transmitted correspondingly quickly. The quality of closed-loop control able to be achieved is correlated via the achievable cycle time with the overall volume of data transferred. The duration of the areas 20, during which the non-real-time-critical data will be transmitted on the one hand represents a dead time and on the other hand lengthens the minimum possible cycle time. To improve closed-loop control or to reduce the minimum possible cycle time an arrangement in accordance with FIG. 3 is provided. FIG. 3 likewise shows a section of a communication system with two subscribers, a first device 10 and a second device 12. In addition to the line 14 which is connected via the interfaces 1 of the devices 10 and 12, there is a second line 22 which is connected via the interface 2 of the device 10 and the interface 2 of the device 12.

In addition to the connection of the line 22, the controller must also operate in a different way for assigning the data compared to the prior art. In particular the controller for assigning the data in device 10 must assign all real-time-critical data which is to be sent to the second device 12 or which is received by the latter to interface 1. It must assign all non-real-time-critical data which is to be sent to the second device 12 or which is to be received by the latter to the interface 2. The result of this is that the real time-critical data will be sent over a line 14 to the second device 12 and also received by this device and that the non-real-time-critical data will be sent from the first device 10 over a line 22 and will also be received over this line by the second device 12. The controller for assigning the data in the second device 12 is to be modified accordingly, which the function of a receiver being assumed in mirror image if the first device 10 is the sender and vice-versa. With the exception of the controller for assigning the data, nothing else needs to be changed in the two devices compared to the prior art are shown in FIG. 1. In particular those layers of the communications software (communications stack) which include the services of the communication system, are not changed. The change when compared to the prior art merely consists of the communications services which belong in their entirety logically to one communication connection not being transmitted sequentially via one interface but depending on the transmission method (i.e. whether they are real time-critical or non-real-time-critical) being transferred to the respective interface. The scheduling which is sequential in the prior art is made parallel.

The interfaces are now controlled by the controller as follows: The real time-critical data can now be transmitted over the line 14 in very short cycles 24, with these transmission cycles being able to have a duration of 31.25 µs, which enables an optimum closed loop control quality to be obtained in the closed-loop control of a machine tool. The non-real-time-critical data is transmitted over the second line 22 and this is done in significantly longer cycles 26.

Figure 5:
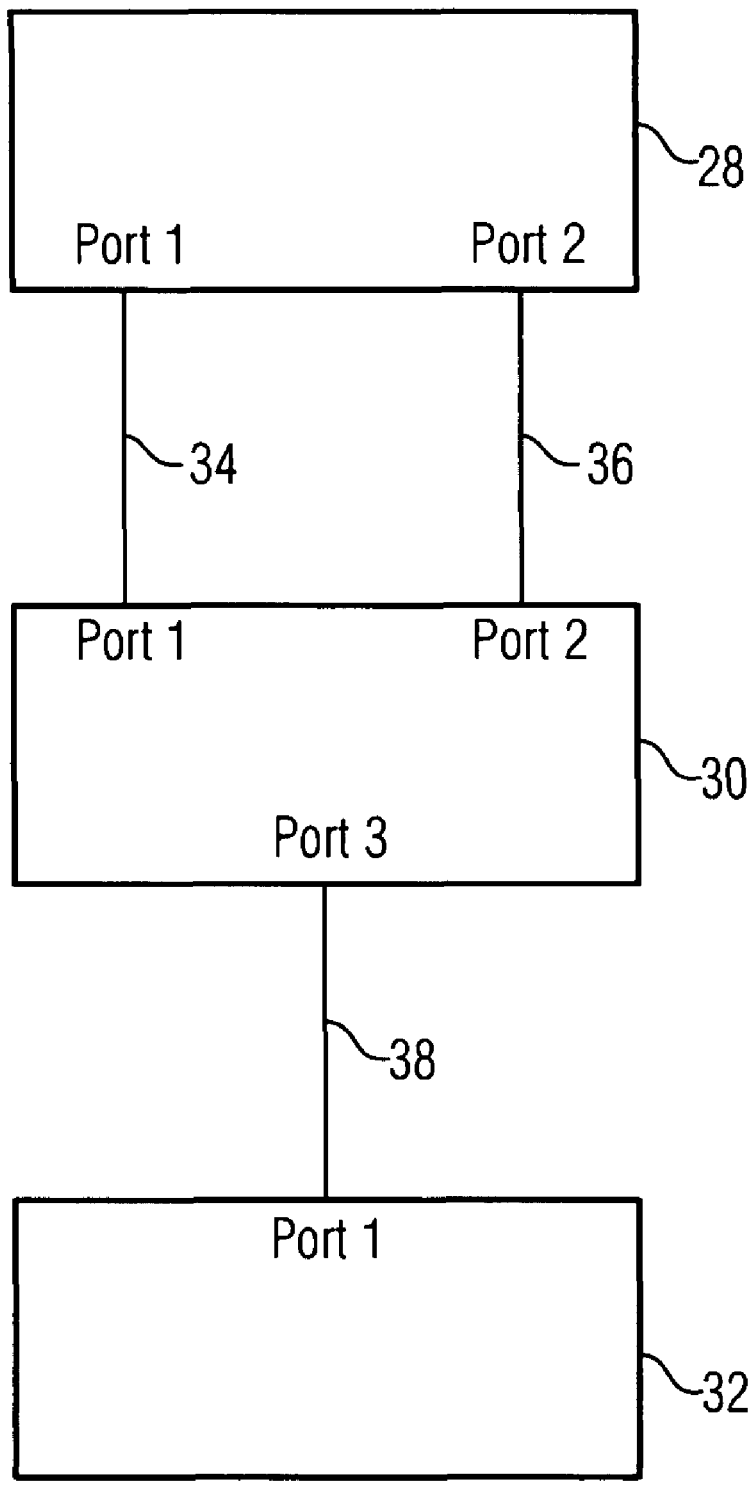
FIG. 5 shows a section from a switched network with three subscribers, with a data bottleneck being embodied in accordance with the invention.

FIG. 5 now shows a larger section from a switched network with three subscribers 28, 30 and 32. The subscriber 28 is sending data in this case while the subscriber 30 is receiving and sending data and the subscriber 32 is only receiving data (this is only by way of an example). Since the subscriber 30 is both receiving and also sending data sent to the subscriber 32, the sender 28 must send more data over a data connection to the subscriber 30 than to the subscriber 32. An especially large amount of data is thus transmitted from subscriber 28 to subscriber 30 because the latter is forwarding data and is not creating it itself. This means that there is a data bottleneck between the subscriber 28 and the subscriber 30 compared to the data connection between the subscriber 30 and the subscriber 32. This bottleneck represents the point at which the most data is being transferred in the network. Preferably it is at this point at which two separate lines 34 and 36 are provided, with real-time-critical data are being transmitted separately via the line 34 from the non-real-time-critical data and the non-real-time-critical data being transmitted via the line 36. By contrast there is again only one line 38 between the subscriber 30 and 32 in which the data transmission can be undertaken as shown in FIG. 2. It is thus especially the data bottlenecks, at which a particularly large amount of data is transferred, at which the cycle duration 16 which shown in FIG. 2 cannot be simply restricted as required. It his therefore recommended that a start is made with the greatest bottleneck and a second line is provided there so that the local cycle time can be reduced accordingly. One can then move on to the next largest bottleneck etc. until one line 38 remains left as a data connection via which both real-time-critical and non-real-time-critical data can continue to be transferred since the overall volume of data is small.

The invention thus makes it possible, in a communication system such as a switched network for example, to flexibly provide a second line at specific points, especially at data bottlenecks. This means that it is possible to provide extremely short cycle times on one of the two lines for the transmission of real-time-critical data while on the second line the non-real-time-critical data can be transmitted with any given cycle times.

The invention claimed is:

1. A switched network communication system, comprising:
    a plurality of subscribers connected in pairs via a first data connection line for transmitting data in communications cycles between pairs of subscribers, each subscriber comprising a respective controller that assigns both real-time-critical data and non-real-time-critical data to be transmitted in the communication cycles over the first data connection line by dividing each communication cycle into two areas for sequential transmission of data, wherein one area is for the real-time-critical data and another area is for the non-real-time-critical data;
    a second data connection line in parallel with the first data connection line located between those pairs of subscribers at which the overall volume of real-time-critical data is high, wherein, rather than dividing each communication cycle into two areas on the first data connection line, the respective controllers for those pairs of subscribers divide data between the first and second data connection lines such that real-time-critical data is assigned to the first data connection line so that only the real-time-critical data is transmitted in each communication cycle of the first data connection line and non-real-time-critical data is assigned to the second data connection line so that only the non-real-time-critical data is transmitted in each communication cycle of the second data connection line, and wherein a reduced cycle time is provided on the first data connection line for transmitting real-time-critical data and a long cycle time is retained on the second data connection line for transmitting non-real-time-critical data, thereby remedying a data bottleneck between those pairs of subscribers at which the overall volume of real-time-critical data is high,
    wherein the non-real-time-critical data is transmitted for a planning of the real-time-critical data.

2. The communication system as claimed in claim 1, wherein for those pairs of subscribers at which the overall volume of real-time-critical data is high having a second data connection line, real-time-critical data sent via the first data connection line is sent in transmission cycles of 31.25 µs duration or less.

3. A method for operating a switched network communication system having a plurality of subscribers connected in pairs and having a first data connection line for transmitting data in communications cycles between pairs of subscribers, each subscriber comprising a respective controller that assigns both real-time-critical data and non-real-time-critical data to be transmitted in the communication cycles over the first data connection line by dividing each communication cycle into two areas for sequential transmission of data, wherein one area is for the real-time-critical data and another area is for the non-real-time-critical data, comprising:
    providing a second data connection line in parallel with the first data connection line located between those pairs of subscribers at which the overall volume of real-time-critical data is high, wherein, rather than dividing each communication cycle into two areas on the first data connection line, the respective controllers for those pairs of subscribers divide data between the first and second data connection lines such that real-time-critical data is assigned to the first data connection line so that only the real-time-critical data is transmitted in each communication cycle of the first data connection line and non-real-time-critical data is assigned to the second data connection line so that only the non-real-time-critical data is transmitted in each communication cycle of the second data connection line, and wherein a reduced cycle time is provided on the first data connection line for transmitting real-time-critical data and a long cycle is retained on the second data connection line for transmitting non-real-time-critical data, thereby remedying a data bottleneck between those pairs of subscribers at which the overall volume of real-time-critical data is high,
    wherein the non-real-time-critical data includes data for a planning of the real-time-critical data.

4. The method as claimed in claim 3, wherein for those pairs of subscribers at which the overall volume of real-time-critical data is high having a second data connection line, the real-time-critical data is transmitted in transmission cycles of 31.25 µs duration or less.

5. A method for removing a data bottleneck for data communication in a switched network in which real-time-critical and non-real-time-critical data are transmitted in communication cycles from a first subscriber to a second subscriber and, comprising:
    transmitting real-time-critical and non-real-time-critical and non-real-time-critical data from a first subscriber to a second subscriber and from the second subscriber to a third subscriber,
    wherein more data is transmitted from the first subscriber to the second subscriber than from the second subscriber to the third subscriber,
    rather than transmitting both the real-time-critical and the non-real-time-critical data from the first subscriber to the second subscriber via a first data connection line by dividing each communication cycle into two areas on the first data connection line, which is performed from the second subscriber to the third subscriber, where one area is for the real-time-critical data and the other area is for non-real-time-critical data, transmitting the real-timecritical data via the first data connection line in each communication cycle of the first data connection line during a reduced cycle time and transmitting the non-real-time-critical data via a second connection line in each communication of the second data connection line during a long cycle time, thereby removing a bottleneck between the first and second subscribers, and wherein the real-time-critical data is transmitted in transmission cycles of 31.25 μs duration or less at the data bottleneck, and wherein the non-real-time-critical data is transmitted for a planning of the real-time-critical data.

* * * * *